United States Patent
Inaba et al.

(10) Patent No.: US 9,850,394 B2
(45) Date of Patent: *Dec. 26, 2017

(54) RESIN COMPOSITION, FILLER-CONTAINING RESIN FILM FOR NON-AQUEOUS ELECTROLYTE SECONDARY BATTERY, AND METHOD FOR PRODUCING FILLER-CONTAINING RESIN FILM FOR NON-AQUEOUS ELECTROLYTE SECONDARY BATTERY

(71) Applicant: Kureha Corporation, Tokyo (JP)

(72) Inventors: Yusaku Inaba, Tokyo (JP); Tamito Igarashi, Tokyo (JP); Yuki Sakai, Tokyo (JP); Aya Takeuchi, Tokyo (JP)

(73) Assignee: KUREHA CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/409,014

(22) PCT Filed: Jun. 24, 2013

(86) PCT No.: PCT/JP2013/067216
§ 371 (c)(1),
(2) Date: Dec. 18, 2014

(87) PCT Pub. No.: WO2014/002936
PCT Pub. Date: Jan. 3, 2014

(65) Prior Publication Data
US 2015/0147462 A1    May 28, 2015

(30) Foreign Application Priority Data
Jun. 28, 2012   (JP) .................................. 2012-145518

(51) Int. Cl.
| | |
|---|---|
| *C09D 127/16* | (2006.01) |
| *C08K 3/22* | (2006.01) |
| *H01M 2/14* | (2006.01) |
| *C09D 7/12* | (2006.01) |
| *H01M 2/16* | (2006.01) |
| *H01M 10/052* | (2010.01) |

(52) U.S. Cl.
CPC ............. *C09D 127/16* (2013.01); *C08K 3/22* (2013.01); *C09D 7/1216* (2013.01); *H01M 2/145* (2013.01); *H01M 2/166* (2013.01); *H01M 2/1653* (2013.01); *H01M 2/1673* (2013.01); *C08K 2003/2227* (2013.01); *H01M 2/1646* (2013.01); *H01M 2/1686* (2013.01); *H01M 10/052* (2013.01); *H01M 2220/20* (2013.01); *Y02E 60/122* (2013.01); *Y02P 70/54* (2015.11)

(58) Field of Classification Search
CPC ...... C09D 127/16; C09D 7/1216; C08K 3/22; H01M 2/145; H01M 2/1653; H01M 2/1673; H01M 2/166
See application file for complete search history.

(56) References Cited

U.S. PATENT DOCUMENTS 5,231,155 A * 7/1993 Kappler ............... C09D 127/16
526/249
5,415,958 A   5/1995 Takahashi et al.
(Continued)

FOREIGN PATENT DOCUMENTS

| CN | 1714465 A | 12/2005 |
|---|---|---|
| JP | H06-172452 A | 6/1994 |

(Continued)

OTHER PUBLICATIONS

Dec. 31, 2014 International Preliminary Report on Patentability issued in International Application No. PCT/JP2013/067216.
International Search Report of PCT/JP2013/067216 dated Sep. 17, 2013.
Aug. 31, 2015 Office Action issued in Chinese Patent Application No. 201380016182.5.
Aug. 30, 2016 Office Action issued in Japanese Patent Application No. 2014-522610.

*Primary Examiner* — Dah-Wei D Yuan
*Assistant Examiner* — Jose Hernandez-Diaz
(74) *Attorney, Agent, or Firm* — Oliff PLC

(57) ABSTRACT

An object of the present invention is to provide a filler-containing resin film in which shedding of inorganic materials or the like is suppressed, a resin composition that can be used in production of the filler-containing resin film, and a method for producing the filler-containing resin film. The filler-containing resin film of the present invention is a filler-containing resin film comprising: a vinylidene fluoride copolymer obtained by copolymerizing vinylidene fluoride and a compound represented by formula (1) (in formula (1), $R^1$, $R^2$, and $R^3$ are each independently hydrogen atoms, chlorine atoms, or alkyl groups having from 1 to 5 carbons; and X' is an atomic group having a molecular weight of 472 or less and having a main chain configured from 1 to 19 atoms); and an insulating inorganic filler. The resin film is produced by applying onto a substrate and then drying a resin composition containing the vinylidene fluoride copolymer, the insulating inorganic filler, and an organic solvent.

(1)

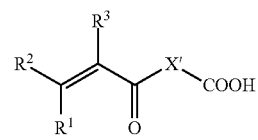

4 Claims, 1 Drawing Sheet

(56) References Cited

U.S. PATENT DOCUMENTS

| | | | | |
|---|---|---|---|---|
| 5,429,891 | A * | 7/1995 | Gozdz | C08J 9/28 |
| | | | | 429/231.95 |
| 6,621,684 | B2 * | 9/2003 | Shimamoto | H01G 9/038 |
| | | | | 252/62.2 |
| 7,947,790 | B2 | 5/2011 | Katsurao et al. | |
| 2002/0045094 | A1 * | 4/2002 | Yoshino | H01M 2/30 |
| | | | | 429/137 |
| 2006/0057464 | A1 * | 3/2006 | Kim | B01D 67/0011 |
| | | | | 429/306 |
| 2009/0098458 | A1 * | 4/2009 | Fujii | H01M 4/02 |
| | | | | 429/209 |
| 2009/0203853 | A1 * | 8/2009 | Fujita | C08F 8/00 |
| | | | | 526/75 |
| 2011/0206963 | A1 | 8/2011 | Fujita et al. | |
| 2012/0115008 | A1 * | 5/2012 | Sano | H01M 2/1653 |
| | | | | 429/144 |
| 2013/0273424 | A1 * | 10/2013 | Watanabe | C09D 127/16 |
| | | | | 429/217 |

FOREIGN PATENT DOCUMENTS

| | | |
|---|---|---|
| JP | H06172472 A | 6/1994 |
| JP | H09320607 A | 12/1997 |
| JP | 2007335168 A | 12/2007 |
| JP | 2011-083870 A | 4/2011 |
| JP | 2012-004103 A | 1/2012 |
| JP | 2012219125 A | 11/2012 |
| JP | 5797206 B2 | 10/2015 |
| WO | 2004/092257 A1 | 10/2004 |
| WO | 2012/090876 A1 | 7/2012 |

* cited by examiner

RESIN COMPOSITION, FILLER-CONTAINING RESIN FILM FOR NON-AQUEOUS ELECTROLYTE SECONDARY BATTERY, AND METHOD FOR PRODUCING FILLER-CONTAINING RESIN FILM FOR NON-AQUEOUS ELECTROLYTE SECONDARY BATTERY

TECHNICAL FIELD

The present invention relates to a resin composition, a filler-containing resin film for a non-aqueous electrolyte secondary battery, and a method for producing a filler-containing resin film for a non-aqueous electrolyte secondary battery.

BACKGROUND OF THE INVENTION

Recently, electronic technology has been remarkably developed, and various appliances have been made smaller and lighter. Along with the miniaturization and reduction in weight of electronic appliances, miniaturization and reduction in weight of batteries, serving as power sources of these electronic appliances, have been demanded. As batteries that have small volume and mass but are capable of providing large amounts of energy, non-aqueous electrolyte secondary batteries using lithium have been used. In addition, it has been proposed to use non-aqueous electrolyte secondary batteries as power sources for hybrid cars, electric cars, and the like, and the non-aqueous electrolyte secondary batteries have been put into practical use.

Generally, a non-aqueous electrolyte secondary battery has a positive electrode, a negative electrode, and a separator provided therebetween for insulating the positive electrode and the negative electrode. Conventionally, a porous film of a polyolefin-based polymer has been used as a separator used in the non-aqueous electrolyte secondary battery.

In the non-aqueous electrolyte secondary batteries, due to ions (in the case of a lithium-ion secondary battery, lithium ion ($Li^+$)) moving between a positive electrode and a negative electrode through a separator, charging and discharging are possible. Therefore, the separator is required to not inhibit ions from moving freely, and a porous film having a plurality of microscopic holes has been used as the separator.

In addition, the separator is required to have a so-called shutdown function. The shutdown function is a function that improves safety of the non-aqueous electrolyte secondary battery by, in the case where a fine short circuit has occurred in a battery, inhibiting the movement of ions by blocking the holes in the part where the short circuit occurred in order to make the battery lose the function at the part. In the porous film of a polyolefin-based polymer, the shutdown function is achieved by, in the case where a fine short circuit occurred in the battery, melting the part where the short circuit occurred by increasing the temperature and thereby blocking the holes.

However, for example, if the battery temperature exceeds 150° C. due to an instant increase in temperature, the separator may instantly shrink and the part of the short circuit of the positive electrode and the negative electrode may expand. In this case, the battery temperature may reach several hundred degrees Celsius or higher, and it has been a safety problem of the non-aqueous electrolyte secondary battery.

To enhance the safety of the non-aqueous electrolyte secondary battery at high temperatures, it has been proposed to provide a porous film containing an inorganic material in between a conventional separator, such as a porous film of a polyolefin-based polymer, and a positive or negative electrode.

For example, it has been proposed to use a specific α-alumina when an inorganic oxide porous film having insulating properties is formed (e.g. see Patent Document 1). Patent Document 1 proposes to form an inorganic oxide porous film by applying an inorganic oxide slurry formed from α-alumina, a binder, and a solvent on an electrode or a separator, and drying the slurry. Furthermore, Patent Document 1 provides examples of various resins, as a binder, including polyvinylidene fluoride (PVDF).

The primary purpose of the invention described in Patent Document 1 is to provide an inorganic oxide porous material for use in a lithium-ion secondary battery that is thermally stable and highly uniform and has a suitable porosity from the perspective of electrical conductivity of lithium ion.

However, the investigation of the adhesion between an inorganic material and a binder resin that constitute a porous film containing the inorganic material was not sufficient.

CITATION LIST

Patent Literature

Patent Document 1: Japanese Unexamined Patent Application Publication No. 2012-004103A

SUMMARY OF INVENTION

Technical Problem

When a porous film containing an inorganic material is provided between a conventional separator and a positive or negative electrode, the inorganic material is required not to be peeled off.

However, resins that have been conventionally used with inorganic materials such as polyvinylidene fluoride have insufficient adhesion toward inorganic materials.

An object of the present invention is to provide a filler-containing resin film in which shedding of inorganic materials or the like is suppressed.

Furthermore, another object of the present invention is to provide a resin composition that can be used in production of the filler-containing resin film, and a method for producing the filler-containing resin film.

Solution to Problem

As a result of diligent research to achieve the above described objects, the present inventors have found that the above described problems can be solved by using a particular vinylidene fluoride copolymer, and thus completed the present invention.

That is, the resin composition of the present invention is a resin composition comprising: a vinylidene fluoride copolymer obtained by copolymerizing vinylidene fluoride and a compound represented by formula (1) below; an insulating inorganic filler; and an organic solvent.

The filler-containing resin film for a non-aqueous electrolyte secondary battery of the present invention is a filler-containing resin film for a non-aqueous electrolyte secondary battery comprising: a vinylidene fluoride copolymer obtained by copolymerizing vinylidene fluoride and a compound represented by formula (1) below; and an insulating inorganic filler.

The method for producing a filler-containing resin film for a non-aqueous electrolyte secondary battery of the present invention is a method for producing a filler-containing resin film for a non-aqueous electrolyte secondary battery, the method comprising the steps of: applying a resin composition containing: a vinylidene fluoride copolymer obtained by copolymerizing vinylidene fluoride and a compound represented by formula (1) below, an insulating inorganic filler, and an organic solvent on a substrate; and drying the resin composition.

[Formula 1]

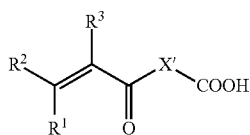

(1)

In formula (1), $R^1$, $R^2$, and $R^3$ are each independently hydrogen atoms, chlorine atoms, or alkyl groups having from 1 to 5 carbons; and X' is an atomic group having a molecular weight of 472 or less and having a main chain configured from 1 to 19 atoms.

The substrate is preferably an electrode or a separator.

Furthermore, in the present invention, the compound represented by formula (1) above is preferably a compound represented by formula (2) below:

[Formula 2]

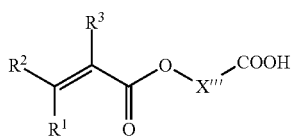

(2)

In formula (2), $R^1$, $R^2$, and $R^3$ are each independently hydrogen atoms, chlorine atoms, or alkyl groups having from 1 to 5 carbons; and X''' is an atomic group having a molecular weight of 456 or less and having a main chain configured from 1 to 18 atoms.

Effect of the Invention

Since the filler-containing resin film for a non-aqueous electrolyte secondary battery produced by using the resin composition of the present invention has sufficient air permeability, the film does not inhibit ions from moving between a positive electrode and a negative electrode. Furthermore, since the insulating inorganic filler adheres to the vinylidene fluoride copolymer with sufficient strength in the resin film, shedding of the insulating inorganic filler is suppressed.

DESCRIPTION OF EMBODIMENTS

Figure 1:
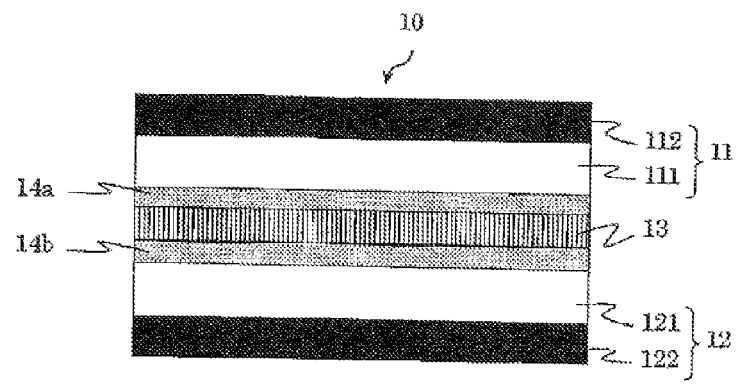
FIG. 1 is a cross sectional schematic diagram illustrating a structure of a non-aqueous electrolyte secondary battery containing a filler-containing resin film of the present invention.

Next, the present invention will be described in further detail.

The resin composition of the present invention is a resin composition comprising: a vinylidene fluoride copolymer obtained by copolymerizing vinylidene fluoride and a compound represented by formula (1) below; an insulating inorganic filler; and an organic solvent.

[Vinylidene fluoride copolymer] The vinylidene fluoride copolymer used in the present invention is a copolymer obtained by copolymerizing vinylidene fluoride and a compound represented by formula (1) below.

[Formula 3]

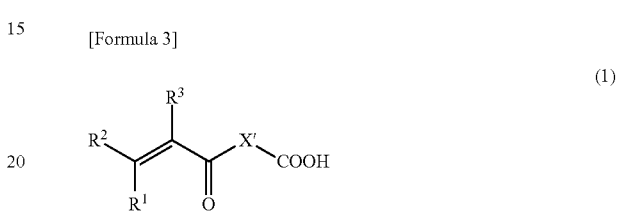

(1)

In formula (1), $R^1$, $R^2$, and $R^3$ are each independently hydrogen atoms, chlorine atoms, or alkyl groups having from 1 to 5 carbons; and X' is an atomic group having a molecular weight of 472 or less and having a main chain configured from 1 to 19 atoms.

The vinylidene fluoride copolymer used in the present invention is a polymer containing a structural unit derived from vinylidene fluoride and a structural unit derived from the compound represented by formula (1) above. In addition, the vinylidene fluoride copolymer may further contain a structural unit derived from another monomer.

Since the vinylidene fluoride copolymer used in the present invention contains a structural unit derived from the compound represented by formula (1) above, the vinylidene fluoride copolymer exhibits excellent adhesion. The compound represented by formula (1) above is preferably a compound represented by formula (2) below. Since, in the vinylidene fluoride copolymer using the compound represented by formula (1) above, a carboxyl group functioning as an adhesive functional group is present via a spacer on a main chain of the vinylidene fluoride polymer, degree of freedom of the arrangement of the carboxyl group is high. Therefore, the functional group can be easily arranged at a position where the functional group can easily exhibit its adhesion imparting properties, and the present inventors conceived that the vinylidene fluoride copolymer used in the present invention exhibits excellent adhesion toward inorganic fillers. Furthermore, the compound represented by formula (1) above contains, in addition to a carboxyl group, a carbonyl group. The present inventors conceived that, since the carbonyl group can be coordinated to a metal atom, the vinylidene fluoride copolymer obtained by using the compound has excellent adhesion particularly toward metals, metal oxides, and the like.

[Formula 4]

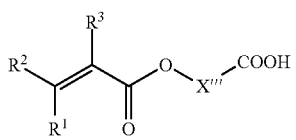

(2)

In formula (2), $R^1$, $R^2$, and $R^3$ are each independently hydrogen atoms, chlorine atoms, or alkyl groups having from 1 to 5 carbons; and X''' is an atomic group having a molecular weight of 456 or less and having a main chain configured from 1 to 18 atoms.

In formulas (1) and (2) above, although $R^1$, $R^2$, and $R^3$ described above are each independently hydrogen atoms, chlorine atoms, or alkyl groups having from 1 to 5 carbons, from the perspective of polymerization reactivity, in particular, $R^1$ and $R^2$ are preferably substituents with small steric hindrance, and $R^1$ and $R^2$ are preferably hydrogens or alkyl groups having from 1 to 3 carbons, and are more preferably hydrogens or methyl groups.

In formula (1) above, although the molecular weight of the atomic group represented by X' is 472 or less, the molecular weight is preferably 172 or less. Furthermore, the lower limit of the molecular weight of the atomic group represented by X' is not particularly limited; however, X' is typically in a form of —$CH_2$— and, that is, the molecular weight thereof is 14.

Furthermore, in formula (2) above, although the molecular weight of the atomic group represented by X''' is 456 or less, the molecular weight is preferably 156 or less. Furthermore, the lower limit of the molecular weight of the atomic group represented by X''' is not particularly limited; however, X''' is typically in a form of —$CH_2$— and, that is, the molecular weight thereof is 14.

From the perspective of polymerizability, the molecular weight of the atomic group represented by X' or X''' is preferably in the range described above.

In the atomic group represented by X' in formula (1) above, the main chain of the atomic group is composed of 1 to 19 atoms, preferably composed of 1 to 14 atoms, and more preferably composed of 1 to 9 atoms.

Furthermore, in the atomic group represented by X''' in formula (2) above, the main chain of the atomic group is composed of 1 to 18 atoms, preferably composed of 1 to 13 atoms, and more preferably composed of 1 to 8 atoms.

From the perspective of polymerizability, the number of atoms on the main chain is preferably in the range described above.

Note that, in formulas (1) and (2) above, the "number of atoms on the main chain" means the number of atoms on the backbone of the chain that connects a carboxyl group written on the right side of X' or X''' and a group ($R^1R^2C$=$CR^3$—CO— (in formula (1)); or $R^1R^2C$=$CR^3$—COO— (in formula (2))) written on the left side of X' or X''' and that contains a minimum number of atoms.

Note that the number of atoms on the main chain of 2-acryloyloxyethyl succinate (AES) and 2-carboxyethyl acrylate (CEA) used in working examples are as below.

AES corresponds to a compound represented by formula (1) and a compound represented by formula (2). When the compound represented by formula (1) is AES, the atomic group represented by X' is —$OCH_2CH_2O$—(CO)—$CH_2CH_2$—. The number of atoms on the main chain of the atomic group is the number of atoms on a backbone of the straight chain. That is, an oxygen atom that constitutes a carbonyl group or a hydrogen atom that constitutes a methylene group is not included in the number of atoms on the main chain. That is, the backbone of the main chain is —OCCO—C—CC—, and the number of atoms thereof is 7. In the same manner, when the compound represented by formula (2) is AES, the number of atoms on the main chain of the atomic group represented by X''' is 6.

CEA corresponds to a compound represented by formula (1) and a compound represented by formula (2). When the compound represented by formula (1) is CEA, the number of atoms on the main chain of the atomic group represented by X' is 3, and when the compound represented by formula (2) is CEA, the number of atoms on the main chain of the atomic group represented by X''' is 2.

Furthermore, the number of atoms on the main chain of acryloyloxyethyl phthalic acid is as below. Acryloyloxyethyl phthalic acid is a compound represented by formula (B) below, and corresponds to a compound represented by formula (1) and a compound represented by formula (2). When the compound represented by formula (1) is acryloyloxyethyl phthalic acid, the atomic group represented by X' is represented by formula (B') below. The number of atoms on the main chain of the atomic group is the number of atoms on the backbone of the chain that connects, with a minimum number of atoms, a carboxyl group bonded to the atomic group and a group ($CH_2$=CH—CO—) written on the left side. That is, in formula (B') below, the number of atoms on the backbone of the chain connecting the carboxyl group and the group ($CH_2$=CH—CO—) written on the left is considered to be 7 which is the number of atoms shown in formula (B'-1), or 11 which is the number of atoms shown in formula (B'-2); however, in this case, the number of atoms on the main chain is 7, which is the smaller number. In the same manner, when the compound represented by formula (2) is acryloyloxyethyl phthalic acid, the number of atoms on the main chain of the atomic group represented by X''' is 6.

Furthermore, in the case of a compound having a plurality of carboxyl groups, the number of atoms on the main chain is as below. For example, in a compound having a plurality of carboxyl groups, there are chains that respectively connect, with a minimum number of atoms, the carboxyl group and the group written on the left side; however, the number of atoms on the main chain is the smallest value of the numbers of atoms on the backbones of these chains. That is, in a compound having two carboxyl groups, there is a chain for each of the carboxyl groups (hereinafter called "carboxyl group A" and "carboxyl group B" for convenience) that connects, with a minimum number of atoms, the carboxyl group and the group written on the left side; however, for example, in the case where the number of atoms of the backbone of the chain connecting, with a minimum number of atoms, the group written on the left side and carboxyl group A is 3 and the number of atoms of the backbone of the chain connecting, with a minimum number of atoms, the group written on the left side and carboxyl group B is 6, the number of atoms on the main chain in the compound is 3. As a specific example, a compound represented by formula (C) below will be described. The compound represented by formula (C) below corresponds to a compound represented by formula (1) and a compound represented by formula (2). The compound represented by formula (C) has two carboxyl groups. When the compound represented by formula (1) is the compound represented by formula (C), the number of atoms on the backbone of the chain connecting the carboxyl group and the group ($CH_2$=CH—CO—) written on the left side with a minimum number of atoms is considered to be 5 which is the number of atoms shown in formula (C-1), or 7 which is the number of atoms shown in formula (C-2); however, in this case, the number of atoms on the main chain is 5, which is a smaller number of atoms on the backbone. In the same manner, when the compound represented by formula (2) is the compound represented by formula (C), the number of atoms on the main chain of the atomic group represented by X''' is 4.

[Formula 5]

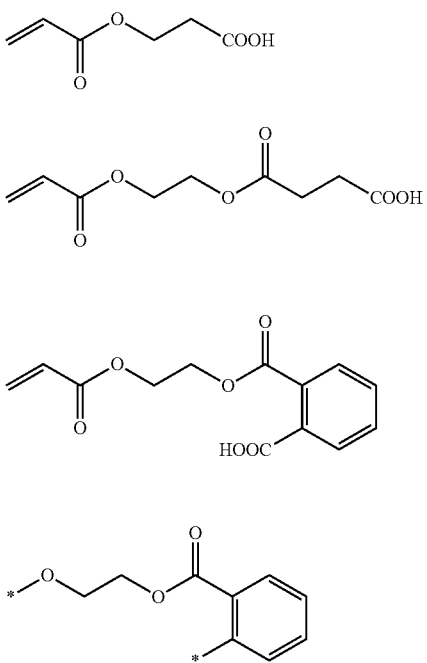

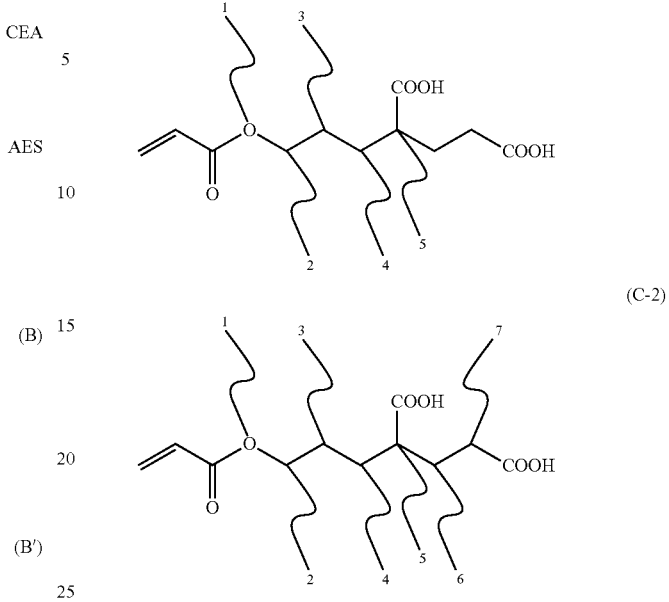

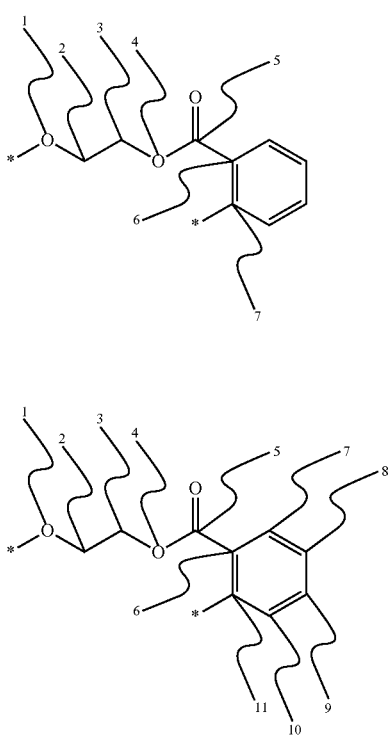

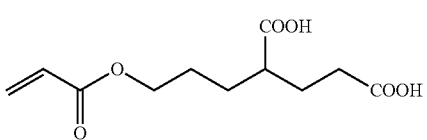

Note that, in the present invention, (meth)acryl and (meth)acrylate mean acryl and/or methacryl and acrylate and/or methacrylate, respectively.

Examples of the compound represented by formula (2) above include 2-carboxyethyl acrylate, 2-carboxyethyl methacrylate, acryloyloxyethyl succinate, methacryloyloxyethyl succinate, acryloyloxyethyl phthalic acid, methacryloyloxyethyl phthalic acid, and the like. Of these, 2-carboxyethyl acrylate, 2-carboxyethyl methacrylate, acryloyloxyethyl succinate, and methacryloyloxyethyl succinate are preferable from the perspective of having excellent copolymerizability with vinylidene fluoride.

The vinylidene fluoride copolymer used in the present invention preferably contains from 0.01 to 10 mol %, more preferably from 0.02 to 7 mol %, and particularly preferably from 0.03 to 4 mol %, of a structural unit derived from the compound represented by formula (1) above (provided that the total of a structural unit derived from vinylidene fluoride and a structural unit derived from the compound represented by formula (1) is 100 mol %). Furthermore, the vinylidene fluoride copolymer preferably contains from 90 to 99.99 mol %, more preferably from 93 to 99.98 mol %, and particularly preferably from 96 to 99.97 mol %, of a structural unit derived from vinylidene fluoride.

Note that, in the vinylidene fluoride copolymer used in the present invention, the content of the structural unit derived from the compound represented by formula (1) and the content of the structural unit derived from vinylidene fluoride can be typically determined by $^1$H NMR spectrum of the vinylidene fluoride copolymer or by neutralization titration.

Furthermore, examples of the other monomer include fluorine-based monomers or hydrocarbon-based monomers, such as ethylene and propylene, that are copolymerizable with vinylidene fluoride, and monomers that are copolymerizable with the compound represented by formula (1) above. Examples of the fluorine-based monomer that is copolymerizable with vinylidene fluoride include vinyl fluoride, trifluoroethylene, tetrafluoroethylene, chlorotrifluoroethylene, hexafluoropropylene, perfluoroalkylvinylether exemplified by perfluoromethylvinylether, and the like. Examples of the monomer that is copolymerizable with the compound represented by formula (1) above include (meth)acrylic acid, alkyl meth(acrylate) compounds exemplified by methyl (meth)acrylate, and the like. Note that the other monomer may be used alone or in a combination of two or more types thereof.

For cases where the vinylidene fluoride copolymer used in the present invention contains a structural unit derived from the other monomer, the vinylidene fluoride copolymer preferably contains from 0.01 to 10 mol % of a structural unit derived from the other monomer relative to 100 mol % of structural units derived from all the monomers constituting the copolymer.

The vinylidene fluoride copolymer used in the present invention can be obtained by copolymerizing vinylidene fluoride, the compound represented by formula (1) above and, as necessary, the other monomer.

The method of copolymerizing the vinylidene fluoride copolymer used in the present invention is not particularly limited; however, the method such as suspension polymerization, emulsion polymerization, and solution polymerization are generally used. From the perspectives of ease of post treatment and the like, aqueous suspension polymerization and emulsion polymerization are preferable, and aqueous suspension polymerization is particularly preferable.

In suspension polymerization using water as a dispersing medium, a suspending agent, such as methylcellulose, methoxylated methylcellulose, propoxylated methylcellulose, hydroxyethylcellulose, hydroxypropylcellulose, polyvinyl alcohol, polyethylene oxide, and gelatin, may be used by adding in a range of 0.005 to 1.0 parts by mass, and preferably in a range of 0.01 to 0.4 parts by mass, per 100 parts by mass of all the monomers used in the copolymerization (vinylidene fluoride, the compound represented by formula (1), and the other monomer that is copolymerized as necessary).

As a polymerization initiator, diisopropyl peroxydicarbonate, di-n-propyl peroxydicarbonate, di-n-heptafluoropropyl peroxydicarbonate, isobutyryl peroxide, di(chlorofluoroacyl)peroxide, di(perfluoroacyl)peroxide, t-butyl peroxypivalate, and the like can be used. The used amount thereof is from 0.05 to 5 parts by mass, and preferably from 0.15 to 2 parts by mass, per 100 parts by mass of all the monomers used in the copolymerization (vinylidene fluoride, the compound represented by formula (1), and the other monomer that is copolymerized as necessary).

Furthermore, the degree of polymerization of the resulting vinylidene fluoride copolymer can be adjusted by adding a chain transfer agent, such as ethyl acetate, methyl acetate, diethyl carbonate, acetone, ethanol, n-propanol, acetaldehyde, propylaldehyde, ethylpropionate, and carbon tetrachloride. In the case of using a chain transfer agent, the used amount of the chain transfer agent is typically from 0.1 to 5 parts by mass, and preferably from 0.5 to 3 parts by mass, per 100 parts by mass of all the monomers used in the copolymerization (vinylidene fluoride, the compound represented by formula (1), and the other monomer that is copolymerized as necessary).

Furthermore, the charged amount of all the monomer used in the copolymerization (vinylidene fluoride, the compound represented by formula (1), and the other monomer that is copolymerized as necessary) is, in terms of a ratio "total mass of the monomers":"mass of water", typically from 1:1 to 1:10, and preferably from 1:2 to 1:5.

The polymerization temperature T is appropriately selected depending on the 10 hour half-life temperature $T_{10}$ of the polymerization initiator. The polymerization temperature T is typically selected from a range of $T_{10}-25°$ C.$\leq T \leq T_{10}+25°$ C. For example, $T_{10}$ of t-butyl peroxypivalate is 54.6° C., and $T_{10}$ of diisopropyl peroxydicarbonate is 40.5° C. (see a product catalog from NOF Corporation). Therefore, in the polymerization using t-butyl peroxypivalate and diisopropyl peroxydicarbonate as polymerization initiators, the polymerization temperatures T are each appropriately selected from a range of 29.6° C.$\leq T \leq 79.6°$ C. and a range of 15.5° C.$\leq T \leq 65.5°$ C. Although the polymerization time is not particularly limited, the polymerization time is preferably 100 hours or less from the perspective of productivity. The polymerization is typically performed under increased pressure, and preferably at 2.0 to 8.0 MPa-G.

By performing aqueous suspension polymerization under the conditions described above, vinylidene fluoride, the compound represented by formula (1), and the other monomer that is copolymerized as necessary can be easily copolymerized to obtain the vinylidene fluoride copolymer of the present invention.

The vinylidene fluoride copolymer used in the present invention preferably has an inherent viscosity (logarithmic viscosity at 30° C. of a solution in which 4 g of a resin is dissolved in 1 L of N,N-dimethylformamide; hereinafter the same) in a range of 0.5 to 5.0 dL/g, and more preferably in a range of 1.0 to 4.0 dL/g. As long as the viscosity is in the range described above, the vinylidene fluoride copolymer can be suitably used in the production of the filler-containing resin film.

The inherent viscosity $\eta_i$ can be determined by dissolving 80 mg of vinylidene fluoride copolymer in 20 mL of N,N-dimethylformamide, measuring the mixture using a Ubbelohde viscometer in a thermoregulated bath at 30° C., and performing calculation using the following equation.

$$\eta_i = (1/C) \cdot \ln(\eta/\eta_0)$$

Here, $\eta$ is the viscosity of the polymer solution, $\eta_0$ is the viscosity of the N,N-dimethylformamide alone of the solvent, and C is 0.4 g/dL.

Furthermore, the vinylidene fluoride copolymer has an absorbance ratio ($A_R$), represented by formula (I) below obtained by infrared absorption spectroscopy, preferably in a range of 0.01 to 5.0, and more preferably in a range of 0.05 to 3.0. If $A_R$ is less than 0.01, the adhesion to the filler contained in the filler-containing resin film may be insufficient. On the other hand, if $A_R$ exceeds 5.0, anti-electrolyte property of the vinylidene fluoride copolymer tends to decrease. Note that the infrared absorption spectroscopy of the polymer is performed by obtaining an infrared absorption spectrum of a film that is produced by subjecting the polymer to hot pressing. Specifically, the vinylidene fluoride copolymer is subjected to hot pressing at 200° C. to produce a pressed sheet of 30 mm×30 mm. Thereafter, the IR spectrum of the pressed sheet in a range of 1500 cm$^{-1}$ to 4000 cm$^{-1}$ is obtained using the infrared spectrophotometer FT-730 (manufactured by HORIBA, Ltd.).

$$A_R = A_{1700-1800}/A_{3023} \quad (I)$$

In the equation (I) above, $A_{1700-1800}$ is the absorbance detected in a range of 1700 to 1800 cm$^{-1}$ assigned to the stretching vibration of a carbonyl group. $A_{3023}$ is the absorbance detected around 3023 cm$^{-1}$ assigned to the stretching vibration of CH. $A_R$ is a measure indicating the content of carbonyl groups that are present in the vinylidene fluoride copolymer.

Furthermore, in the vinylidene fluoride copolymer used in the present invention, the randomness of structural units derived from the compound represented by formula (1) is preferably 40% or greater, more preferably 50% or greater, and particularly preferably 60% or greater. Although details of this are not known, if the randomness is in the range described above, uniformity of the polymer chain is enhanced, so that the carboxyl groups can exhibit the adhesion imparting ability more efficiently, which is preferable.

Note that, in the present invention, the randomness is an indicator that indicates how much degree the structural units that is derived from the compound represented by formula (1) and that is present in the vinylidene fluoride copolymer used in the present invention are dispersed in the polymer chain. A lower randomness indicates that the structural units derived from the compound represented by formula (1) tend to be present more continuously, in other words, the vinylidene fluoride copolymer tends to have a chain in which compounds represented by formula (1) are polymerized with each other (hereinafter, also referred to as a polymer chain derived from the compound represented by formula (1)). On the other hand, a higher randomness indicates that the structural units derived from the compound represented by formula (1) tend to be present more independently, in other words, the structural units derived from the compound represented by formula (1) tend to be discontinuous and bonded to structural units derived from vinylidene fluoride.

The randomness of the vinylidene fluoride copolymer used in the present invention can be determined by dividing the content [mol %] of polymer chains derived from the compound represented by formula (1) by the content [mol %] of structural units derived from the compound represented by formula (1) (randomness [%]=content [mol %] of polymer chains derived from compound represented by formula (1)/content [mol %] of structural units derived from compound represented by formula (1)×100). Note that the mole percentage (mol %) is relative to the content of structural units derived from vinylidene fluoride taken as 100 mol %. Furthermore, the content of polymer chains derived from the compound represented by formula (1) can be determined by $^{19}$F NMR spectroscopy, and the content of structural units derived from the compound represented by formula (1) can be determined by, for example, $^{1}$H NMR spectroscopy or neutralization titration.

For example, for cases where the vinylidene fluoride copolymer used in the present invention is a copolymer of vinylidene fluoride and acryloyloxyethyl succinate, the randomness can be determined by the method described below. In a $^{19}$F NMR spectrum, a peak of $CF_2$ adjacent to the acryloyloxyethyl succinate unit is observed around −94 ppm. The mole percentage (mol %) of the acryloyloxyethyl succinate chains is determined from an integral ratio of this peak to all the peaks in the spectrum. The randomness can be determined as a ratio of the mole percentage (mol %) of the acryloyloxyethyl succinate chain to the mole percentage (mol %) of all the structural units derived from the acryloyloxyethyl succinate in the polymer determined by $^{1}$H NMR spectroscopy, neutralization titration, or the like (randomness [%]=mole percentage (mol %) of acryloyloxyethyl succinate chains/mole percentage (mol %) of all structural units derived from acryloyloxyethyl succinate×100).

Note that, for carboxyethyl acrylate (CEA) used in Working Example 2, the randomness can be calculated by the same measurement method described above.

An example of the method for producing a vinylidene fluoride copolymer used in the present invention having the randomness in the range described above is a method that adds a compound represented by formula (1) continuously while the suspension polymerization described above or the like is being performed.

[Insulating Inorganic Filler]

The insulating inorganic filler used in the present invention is not particularly limited, and a conventionally used insulating inorganic filler can be used as a resin film provided between a separator and a positive or negative electrode of a non-aqueous electrolyte secondary battery.

Examples of the insulating inorganic filler include oxides such as silicon dioxide (SiO2), alumina ($Al_2O_3$), titanium dioxide ($TiO_2$), calcium oxide (CaO), strontium oxide (SrO), barium oxide (BaO), magnesium oxide (MgO); hydroxides such as magnesium hydroxide ($Mg(OH)_2$), calcium hydroxide ($Ca(OH)_2$), aluminum hydroxide ($Al(OH)_3$); carbonates such as calcium carbonate ($CaCO_3$); sulfates such as barium sulfate; nitrides; clay minerals; and the like. The insulating inorganic filler may be used alone or in a combination of two or more types thereof.

The insulating inorganic filler is preferably alumina or silicon dioxide from the perspectives of safety of the battery and stability of the coating liquid.

The average particle size of the insulating inorganic filler is preferably from 5 nm to 2 μm, and more preferably from 10 nm to 1 μm.

A commercially available product may be used as the insulating inorganic filler used in the present invention. For example, commercially available high purity alumina particles such as AKP3000 (manufactured by Sumitomo Chemical Co., Ltd.) can be used.

[Organic Solvent]

As the organic solvent used in the present invention, an organic solvent that can dissolve the vinylidene fluoride copolymer is used, and a solvent having a polarity is preferably used. Specific examples of the organic solvent include N-methyl-2-pyrrolidone, N,N-dimethylformamide, N,N-dimethylacetamide, dimethylsulfoxide, hexamethylphosphoramide, dioxane, tetrahydrofuran, tetramethylurea, triethyl phosphate, trimethyl phosphate, acetone, 2-butanone, cyclohexanone, and the like. N-methyl-2-pyrrolidone, N,N-dimethylformamide, acetone, and 2-butanone are preferable. Furthermore, the non-aqueous solvent may be used alone or in a combination of two or more types thereof.

[Resin Composition]

The resin composition of the present invention contains the vinylidene fluoride copolymer, the insulating inorganic filler, and the organic solvent described above.

The vinylidene fluoride copolymer contained in the resin composition of the present invention exhibits strong adhesion toward the insulating inorganic filler. Therefore, it is preferable to produce the filler-containing resin film for a non-aqueous electrolyte secondary battery using the resin composition of the present invention since the insulating inorganic filler does not peel off from the obtained resin film.

The resin composition of the present invention preferably contains from 0.5 to 80 parts by mass of the vinylidene fluoride copolymer and from 99.5 to 20 parts by mass of the insulating inorganic filler, and more preferably contains from 1 to 50 parts by mass of the vinylidene fluoride copolymer and from 99 to 50 parts by mass of the insulating inorganic filler per 100 parts total mass of the vinylidene fluoride copolymer and the insulating inorganic filler in the resin composition.

Furthermore, the resin composition of the present invention preferably contains from 50 to 4900 parts by mass, and more preferably from 200 to 1900 parts by mass, of the organic solvent per 100 parts total mass of the vinylidene fluoride copolymer and the insulating inorganic filler in the resin composition.

The preparation method of the resin composition of the present invention is not particularly limited, and, for example, the resin composition may be obtained by adding and stirring the vinylidene fluoride copolymer and the insulating inorganic filler in the organic solvent in order to dissolve the vinylidene fluoride copolymer and to disperse the insulating inorganic filler. In addition, the resin composition may also be prepared by preparing a solution in which the vinylidene fluoride copolymer is dissolved by adding and stirring the vinylidene fluoride polymer in a part of the organic solvent; preparing a dispersion liquid in which the insulating inorganic filler is dispersed by adding and stirring the insulating inorganic filler in the rest of the organic solvent; and mixing the solution and the dispersion liquid.

In order to adjust the viscosity of the resin composition and/or adhesion between the vinylidene fluoride copolymer and the insulating inorganic filler of the present invention, another vinylidene fluoride copolymer may be blended in addition to the vinylidene fluoride copolymer described above.

The resin composition of the present invention may contain, as necessary, various additives such as organic fillers, dispersing agents, electrolyte solutions, electrolytes, electrolyte polymers, and the like.

[Filler-Containing Resin Film for Non-Aqueous Electrolyte Secondary Battery]

The filler-containing resin film for a non-aqueous electrolyte secondary battery of the present invention contains the vinylidene fluoride copolymer and the insulating inorganic filler described above.

The filler-containing resin film for a non-aqueous electrolyte secondary battery of the present invention can be used as a separator auxiliary layer that is provided, generally, in between a separator and a positive or negative electrode constituting the non-aqueous electrolyte secondary battery.

Since the vinylidene fluoride copolymer used in the present invention has superior heat resistance compared to polyolefin which constitutes conventional separators, the safety of a non-aqueous electrolyte secondary battery containing the filler-containing resin film of the present invention is enhanced.

The filler-containing resin film for a non-aqueous electrolyte secondary battery of the present invention is preferable in that the insulating inorganic filler does not peel off.

The filler-containing resin film for a non-aqueous electrolyte secondary battery of the present invention preferably contains from 0.5 to 80 parts by mass of the vinylidene fluoride copolymer and from 99.5 to 20 parts by mass of the insulating inorganic filler, and more preferably contains from 1 to 50 parts by mass of the vinylidene fluoride copolymer and from 99 to 50 parts by mass of the insulating inorganic filler, per 100 parts by mass of the resin film.

The thickness of the filler-containing resin film for a non-aqueous electrolyte secondary battery of the present invention is typically from 0.1 to 30 μm, and preferably from 0.5 to 5 μm, from the perspectives of coatability and ionic conductivity.

Furthermore, as described below, the filler-containing resin film for a non-aqueous electrolyte secondary battery of the present invention is generally formed on an electrode or a separator. For cases where the resin film is formed on a separator, the Gurley air permeability of a separator on which the filler-containing resin film for a non-aqueous electrolyte secondary battery of the present invention is provided is typically from 50 to 1000 s/100 mL, and preferably from 80 to 800 s/100 mL. If the Gurley air permeability is in the range described above, it is preferable that the conductivity of the lithium ion is ensured. When the Gurley air permeability is in the range described above, it is assumed that the filler-containing resin film for a non-aqueous electrolyte secondary battery has a porous structure.

[Method for Producing Filler-Containing Resin Film for Non-Aqueous Electrolyte Secondary Battery]

The method for producing the filler-containing resin film for a non-aqueous electrolyte secondary battery of the present invention is characterized by, generally, applying and drying the resin composition described above on a substrate.

As the substrate, an electrode or a separator is typically used. The electrode and the separator is not particularly limited and an electrode and a separator that are used for non-aqueous electrolyte secondary batteries can be used.

When producing the filler-containing resin film for a non-aqueous electrolyte secondary battery of the present invention, first, the resin composition is applied onto the substrate. For cases where the substrate is a separator, the coating is applied onto at least one surface of the separator, and may be performed on both sides of the separator. Furthermore, for cases where the substrate is an electrode, typically, the coating is applied onto a surface of the electrode mixture layer side of the electrodes, which is a surface adjacent to a separator when a non-aqueous electrolyte secondary battery is assembled.

Furthermore, the method of applying is not particularly limited, and examples thereof include a method of applying the resin composition on the substrate using a bar coater, die coater, comma coater, gravure coater such as a direct gravure, reverse gravure, reverse kiss gravure, off set gravure, or similar gravure coater, reverse roll coater, micro gravure coater, air knife coater, dip coater, and the like.

When the filler-containing resin film for a non-aqueous electrolyte secondary battery of the present invention is produced, drying is performed after the applying.

Drying is performed in order to remove the organic solvent in the resin composition applied onto the substrate, and is typically performed at a temperature of 40 to 200° C. for 2 seconds to 10 minutes. Furthermore, the pressure at the drying is not particularly limited; however, typically, the drying is performed under atmospheric pressure or reduced pressure.

By applying and drying the resin composition on the substrate as described above, the filler-containing resin film for a non-aqueous electrolyte secondary battery can be obtained.

Electrodes and separators that can be used in the present invention will be described below.

(Electrode)

For cases where the substrate on which the resin composition is applied is an electrode, the electrode may be a positive electrode or a negative electrode; however, from the perspective of enhancing oxidation resistance, the electrode is more preferably a positive electrode.

The positive electrode is not particularly limited as long as the positive electrode contains a positive electrode active material that involves in a positive electrode reaction and has a current collecting function; however, in many cases, the positive electrode is composed of a positive electrode mixture layer containing a positive electrode active material and a positive electrode current collector that, as well as functioning as a current collector, serves to hold the positive electrode mixture layer.

Furthermore, the negative electrode is not particularly limited as long as the negative electrode contains a negative electrode active material that involves in a negative electrode reaction and has a current collecting function; however, in many cases, the negative electrode is composed of a negative electrode mixture layer containing a negative electrode active material and a negative electrode current collector that, as well as functioning as a current collector, serves to hold the negative electrode mixture layer.

Note that, in the present specification, a positive electrode and negative electrode may be comprehensively described as "electrodes", a positive electrode mixture layer and negative electrode mixture layer may be comprehensively described as "electrode mixture layers", and a positive electrode current collector and negative electrode current collector may be comprehensively described as "current collectors".

In the present invention, for cases where the filler-containing resin film for a non-aqueous electrolyte secondary battery is formed on an electrode, the resin composition is typically applied onto the electrode mixture layer.

In the present invention, the electrode mixture layer contains an electrode active material and a binding agent, and as necessary, the electrode mixture layer can further contain a conductivity promoter.

Here, the compounding ratio of the electrode active material, the binding agent, and the conductivity promoter in the electrode mixture layer can be a generally used compounding ratio used in conventionally known non-aqueous electrolyte secondary batteries such as lithium-ion secondary batteries; however, the compounding ratio can be appropriately adjusted depending on the type of the electrolyte secondary battery.

The thickness of the electrode mixture layer is typically from 20 to 250 μm.

The electrode active material used in the non-aqueous electrolyte secondary battery of the present invention is not particularly limited, and a conventionally known electrode active material for negative electrodes and a conventionally known electrode active material for positive electrodes can be used.

Here, if the non-aqueous electrolyte secondary battery is a lithium-ion secondary battery, the positive electrode active material constituting the positive electrode mixture layer is preferably a lithium-based positive electrode active material containing at least lithium.

Examples of the lithium-based positive electrode active material include composite metal chalcogen compounds represented by general formula: $LiMY_2$ (M represents at least one type of transition metals such as Co, Ni, Fe, Mn, Cr, and V; Y represents a chalcogen element such as O and S) such as $LiCoO_2$, $LiNi_xCo_{1-x}O_2$ ($0 \leq x \leq 1$), composite metal oxides having a spinel structure such as $LiMn_2O_4$; olivin-type lithium compounds such as $LiFePO_4$; and the like. Note that a commercially available product may be used as the positive electrode active material.

The specific surface area of the positive electrode active material is preferably from 0.05 to 50 $m^2/g$.

On the other hand, examples of the negative electrode active material constituting the negative electrode mixture layer include carbon materials, metal/alloy materials, metal oxides, and the like. Of these, carbon materials are preferable.

As the carbon material, artificial graphite, natural graphite, non-graphitizable carbon, easily graphitizable carbon, or the like is used. Furthermore, the carbon material may be used alone or in a combination of two or more types thereof. When such a carbon material is used, the energy density of the battery can be increased.

The artificial graphite can be obtained by, for example, carbonizing an organic material, heat treating the material at higher temperature, and crushing and sieving the material. The non-graphitizable carbon can be obtained by, for example, calcining a material derived from petroleum pitch at 1000 to 1500° C.

Note that a commercially available product may be used as these negative electrode active materials.

The specific surface area of the negative electrode active material is preferably from 0.3 to 10 $m^2/g$. If the specific surface area exceeds 10 $m^2/g$, decomposed amount of the electrolyte solution may increase thereby increasing the initial irreversible capacity.

Note that the specific surface area of the electrode active material can be determined by nitrogen adsorption method.

However, the positive electrode active material and the negative electrode active material constituting the non-aqueous electrolyte secondary battery of the present invention are not particularly limited to these, and can be appropriately selected depending on the type of the secondary battery.

In the present invention, the electrode mixture layer may further contain a conductivity promoter as necessary. This conductivity promoter is added for the purpose of enhancing the conductivity of the electrode mixture layer in the case where an active material having small electrical conductivity such as $LiCoO_2$ is used. As the conductivity promoter, carbonaceous materials such as carbon black and graphite fine powders or fibers, and metal fine powders or fibers such as nickel and aluminum are used.

The binding agent used in the non-aqueous electrolyte secondary battery of the present invention serves a function of binding the electrode active material and the conductivity promoter described above.

Here, although the binding agent is not particularly limited, binding agents used widely in conventionally known lithium-ion secondary battery can be suitably used. As the binding agent, fluorine-containing resins such as polytetrafluoroethylene, polyvinylidene fluoride, and fluororubber, mixtures of styrene-butadiene rubber and carboxymethyl cellulose, thermoplastic resins such as polypropylene and polyethylene, and the like can be used. Furthermore, a vinylidene fluoride copolymer can be used as the fluorine-containing resin. As the vinylidene fluoride copolymer, vinylidene fluoride-monomethylester maleate copolymer, or a vinylidene fluoride copolymer obtained by copolymerizing the vinylidene fluoride and a compound represented by formula (1), and the like can be used.

The positive electrode current collector and the negative electrode current collector are not particularly limited as long as the positive electrode current collector and the negative electrode current collector have suitable electrical conductivity so that the electricity can be supplied to the outside of the secondary battery, and do not inhibit the electrode reaction of the secondary battery.

Examples of these current collectors used in the present invention include current collectors that are generally used as current collectors for non-aqueous electrolyte secondary batteries such as lithium-ion secondary batteries. Examples of the material for such current collectors include iron, stainless steel, steel, copper, aluminum, nickel, titanium, and the like. Current collectors in which these metals are made into foil, a net, or the like form are suitably used.

For cases where the lithium-ion secondary battery is a non-aqueous electrolyte secondary battery, the positive electrode current collector is preferably a positive electrode current collector formed from aluminum or alloys of aluminum, and of these, a positive electrode current collector formed from aluminum foil is preferable. On the other hand, the negative electrode current collector is preferably a negative electrode current collector formed from copper, and of these, a negative electrode current collector formed from copper foil is preferable. The current collectors constituting the electrodes are not limited to these, and can be appropriately selected depending on the types of the secondary battery. The thickness of the current collector is typically from 5 to 100 μm.

Although the method of producing an electrode formed from a current collector and an electrode mixture layer that can be used in the present invention is not particularly limited, the electrode can be obtained by applying the electrode mixture containing each component constituting the electrode mixture layer onto the current collector and drying.

When preparing the electrode mixture, the order of compounding is not particularly limited as long as the electrode active material, the binding agent, and the conductivity promoter which is added as necessary, and the non-aqueous solvent are mixed into a uniform slurry.

As the non-aqueous solvent that is used to disperse these electrode active material, conductivity promoter, and binding agent, for example, N-methyl-2-pyrrolidone and the like can be used.

Although the electrode used in the present invention is produced by applying the electrode mixture onto the current collector and drying, the application of the electrode mixture is performed on at least one side of the current collector, and preferably performed on both sides. The method of applying the electrode mixture is not particularly limited, and examples of the method include methods of applying the electrode mixture using a bar coater, die coater, or comma coater, and the like.

Furthermore, the drying that is performed after application is typically performed at a temperature of 50 to 150° C. for 1 to 300 minutes. Although pressure at the drying is not particularly limited, the drying is typically performed under atmospheric pressure or reduced pressure. Note that heat treatment can be further performed after the drying. Furthermore, instead of the heat treatment or after the heat treatment, pressing treatment can be further performed. When pressing treatment is performed, the pressing treatment is typically performed at 1 to 200 MPa-G. Performing the pressing treatment is preferable since the electrode density can be enhanced.

(Separator)

When the substrate on which the resin composition is applied is a separator, the separator is not particularly limited.

The separator used in the present invention is a separator that constitutes a non-aqueous electrolyte secondary battery and that serves a function of electrically insulating a positive electrode and a negative electrode and holding the electrolyte solution. The separator used in the present invention is not particularly limited, and examples of the separator include polyolefin-based polymers such as polyethylene and polypropylene, polyester-based polymers such as polyethylene terephthalate, aromatic polyamide-based polymers, polyimide-based polymer such as polyether imide, polyether sulfone, polysulfone, polyether ketone, polystyrene, polyethylene oxide, polycarbonate, polyvinyl chloride, polyacrylonitrile, polymethyl methacrylate, ceramics, and the like, and a monolayer and multilayer porous film, nonwoven fabric, or the like that is formed from the mixture thereof, and the like. In particular, a porous film of polyolefin-based polymer (polyethylene, polypropylene) is preferably used. Examples of the polyolefin-based polymer porous film include monolayer polypropylene separators, monolayer polyethylene separators, and trilayer polypropylene/polyethylene/polypropylene separators that are commercially available as Celgard (registered trademark) from Polypore International, Inc., and the like.

Note that, in order to secure the insulation between the positive electrode structure and the negative electrode structure, the separator is preferably larger than the positive electrode structure and the negative electrode structure.

[Non-Aqueous Electrolyte Secondary Battery]

Hereinafter, the non-aqueous electrolyte secondary battery having the filler-containing resin film for a non-aqueous electrolyte secondary battery of the present invention will be described in detail.

The filler-containing resin film for a non-aqueous electrolyte secondary battery of the present invention is positioned in between an electrode and a separator.

A cross sectional schematic diagram of a non-aqueous electrolyte secondary battery having a filler-containing resin film for a non-aqueous electrolyte secondary battery (hereinafter, also referred to as "separator auxiliary layer") of the present invention is illustrated in FIG. 1.

In the non-aqueous electrolyte secondary battery containing the separator auxiliary layer, the separator auxiliary layer is arranged in between the positive electrode 11 and the separator 13, in between the negative electrode 12 and the separator 13, or both in between the positive electrode 11 and the separator 13 and in between the negative electrode 12 and the separator 13. Note that, in FIG. 1, the separator auxiliary layer arranged in between the positive electrode 11 and the separator 13 is indicated as "14a", and the separator auxiliary layer arranged in between the negative electrode 12 and the separator 13 is indicated as "14b". Note that, in FIG. 1, the separator auxiliary layers are arranged in between the positive electrode 11 and the separator 13 as well as in between the negative electrode 12 and the separator 13; however, it is sufficient for an actual non-aqueous electrolyte secondary battery to have a separator auxiliary layer arranged on at least one side thereof. Note that at least one layer selected from a porous layer formed from a vinylidene fluoride-based polymer, an electrolyte layer or adhesive layer having a vinylidene fluoride-based polymer or an acrylonitrile-based polymer as a matrix polymer may be further contained at an arbitrary position that is in between the positive electrode 11 and the separator auxiliary layer 14a, in between the separator auxiliary layer 14a and the separator 13, in between the negative electrode 12 and the separator auxiliary layer 14b, or in between the separator auxiliary layer 14b and the separator 13 in a range that does not inhibit the ionic conductivity of the non-aqueous electrolyte secondary battery.

Note that the non-aqueous electrolyte secondary battery having a separator auxiliary layer 14a arranged in between the positive electrode 11 and the separator 13 is preferable from the perspective of enhancing the oxidation resistance.

Note that the method for producing the non-aqueous electrolyte secondary battery can be a method that is the same as conventional methods except for using the separator provided with the separator auxiliary layer or the electrode provided with the separator auxiliary layer.

Furthermore, the non-aqueous electrolyte secondary battery can have a publicly known battery structure such as a coin-type battery, button-type battery, cylinder-type battery, or square-type battery structure.

Note that, in FIG. 1, the positive electrode mixture layer constituting the positive electrode 11 is indicated as "111", the positive electrode current collector is indicated as "112", the negative electrode mixture layer constituting the negative electrode 12 is indicated as "121", and the negative electrode current collector is indicated as "122".

Furthermore, examples of the members that constitute the non-aqueous electrolyte secondary battery other than the electrodes, the separator, and the separator auxiliary layer include a non-aqueous electrolyte solution, a cylindrical case, laminated pouch, and the like.

The non-aqueous electrolyte solution is a solution formed by dissolving an electrolyte in a non-aqueous solvent.

Examples of the non-aqueous solvent include aprotic organic solvents that can transport cations and anions constituting the electrolyte, and that does not substantially impair the function of the secondary battery. Examples of such a non-aqueous solvent include organic solvents that are generally used in a non-aqueous electrolyte solution for lithium-ion secondary batteries, and for example, carbonates, halogenated hydrocarbons, ethers, ketones, nitriles, lactones, esters, oxolane compounds, and the like can be used. Of these, propylene carbonate, ethylene carbonate, dimethyl carbonate, diethyl carbonate, ethylmethyl carbonate, 1,2-dimethoxyethane, 1,2-diethoxyethane, tetrahydrofuran, γ-butyrolactone, methyl propionate, ethyl propionate, and the like are preferable. These non-aqueous solvent may be used alone or in a combination of two or more types thereof.

Furthermore, the types of the electrolyte is not particularly limited as long as the electrolyte is an electrolyte in which the constituent cations and anions can be transported by the non-aqueous solvent, and that does not substantially impair the function of the secondary battery. Here, examples of the electrolyte that can be used for cases where the non-aqueous electrolyte secondary battery is a lithium-ion secondary battery include lithium salts of a fluoro complex anion such as $LiPF_6$, $LiAsF_6$, and $LiBF_4$; inorganic lithium salts such as $LiClO_4$, LiCl, and LiBr; and lithium salts of sulfonic acid such as $LiCH_3SO_3$ and $LiCF_3SO_3$; and organic lithium salts such as $Li(CF_3OSO_2)_2N$, $Li(CF_3OSO_2)_3C$, $Li(CF_3SO_2)_2N$, and $Li(CF_3SO_2)_3C$. These electrolytes may be used alone or in a combination of two or more types thereof.

EXAMPLES

Next, the present invention will be further described in detail using examples; however, the present invention is not limited by these examples.

Production Example 1

Production of Vinylidene Fluoride-Acryloyloxyethyl Succinate Copolymer

In an autoclave with a capacity of 2 L, 925 g of ion exchanged water, 0.65 g of Metolose SM-100 (manufactured by Shin-Etsu Chemical Co., Ltd.) as a cellulose-based suspending agent, 0.22 g of acryloyloxyethyl succinate, 4.3 g of 50 wt. % diisopropyl peroxydicarbonate-CFC 225cb solution, and 421 g of vinylidene fluoride were charged, and the temperature was raised to 26° C. in 1 hour.

Thereafter, the temperature was kept at 26° C., and 30 g/L of acryloyloxyethyl succinate aqueous solution was gradually added at a rate of 0.19 g/min. Total of 2.92 g of acryloyloxyethyl succinate was added including the initially added amount.

Polymerization was stopped at the time when the addition of acryloyloxyethyl succinate aqueous solution was completed, and the polymerization was performed for total of 9.1 hours from the start of the temperature increase. Note that the pressure at the initial stage of the polymerization was 4.09 MPa-G, and the pressure at the time of stopping the polymerization was 4.1 MPa-G. Furthermore, the polymerization was performed while stirring at a rotational speed of 600 rpm.

After stopping the polymerization, the polymer slurry was heat treated at 95° C. for 60 minutes. Thereafter, the polymer slurry was dewatered, washed with water, and further dried at 80° C. for 20 hours to obtain polymer powder of vinylidene fluoride-acryloyloxyethyl succinate copolymer.

A $^1H$ NMR spectrum of the polymer powder was recorded under the following conditions.

Device: AVANCE AC 400FT NMR SPECTROMETER, manufactured by Bruker
Measurement Conditions
Frequency: 400 MHz
Measurement solvent: $DMSO-d_6$
Measurement temperature: 25° C.

The $^1H$ NMR spectrum was analyzed to determine the contents of structural units derived from vinylidene fluoride and of structural units derived from acryloyloxyethyl succinate in the polymer based on the integral intensities of the signal at 4.18 ppm mainly assigned to acryloyloxyethyl succinate and of the signals at 2.23 ppm and 2.87 ppm mainly assigned to vinylidene fluoride.

In the obtained vinylidene fluoride copolymer, the content of the structural units derived from vinylidene fluoride (VDF content: mol %) was 99.53 mol %, and the AES content was 0.47 mol %.

A $^{19}F$ NMR spectrum of the polymer powder was recorded under the following conditions.

Device: AVANCE AC 400FT NMR SPECTROMETER, manufactured by Bruker
Measurement Conditions
Frequency: 376 MHz
Measurement solvent: $DMSO-d_6$
Measurement temperature: 25° C.

The $^{19}F$ NMR spectrum was analyzed to determine the content of polymer chains derived from acryloyloxyethyl succinate in the polymer by dividing the intensity of peak(s) (an integral value) at around −94 ppm assigned to the fluorine atoms present in the vinylidene fluoride-derived structural units adjacent to the acryloyloxyethyl succinate units by the intensity of all the peaks assigned to the fluorine atoms in the spectrum. In the obtained vinylidene fluoride copolymer, the content of the polymer chains derived from acryloyloxyethyl succinate was 0.37 mol %.

The yield of the polymer was 33%, the inherent viscosity of the obtained polymer was 2.30 dL/g, the randomness was 78%, and the absorbance ratio ($A_R$) was 0.93.

Production Example 2

Production of Vinylidene Fluoride-Carboxyethyl Acrylate Copolymer

In an autoclave with a capacity of 2 L, 900 g of ion exchanged water, 0.4 g of Metolose 90SH-100 (manufactured by Shin-Etsu Chemical Co., Ltd.) as a cellulose-based suspending agent, 0.2 g of carboxyethyl acrylate, 2.0 g of 50 wt. % t-butyl peroxypivalate-CFC 225cb solution, and 396 g of vinylidene fluoride were charged, and the temperature was raised to 50° C. in 2 hours.

Thereafter, the temperature was kept at 50° C., and 15 g/L of carboxyethyl acrylate aqueous solution was gradually added at such a rate that the polymerization pressure became constant. Total of 4.0 g of carboxyethyl acrylate was added including the initially added amount.

Polymerization was stopped at the time when the addition of carboxyethyl acrylate aqueous solution was completed, and the polymerization was performed for total of 8.6 hours from the start of the temperature increase. Note that the pressure at the initial stage of the polymerization was 6.23 MPa-G, and the pressure at the time of stopping the polymerization was 6.03 MPa-G. Furthermore, the polymerization was performed while stirring at a rotational speed of 600 rpm.

After stopping the polymerization, the polymer slurry was heat treated at 95° C. for 60 minutes. Thereafter, the polymer slurry was dewatered, washed with water, and further dried at 80° C. for 20 hours to obtain polymer powder of vinylidene fluoride-carboxyethyl acrylate copolymer.

A $^1$H NMR spectrum of the polymer powder was recorded in the same manner as in Production Example 1.

The $^1$H NMR spectrum was analyzed to determine the contents of structural units derived from vinylidene fluoride and of structural units derived from carboxyethyl acrylate in the polymer based on the integral intensities of the signal at 4.19 ppm mainly assigned to carboxyethyl acrylate and of the signals at 2.24 ppm and 2.87 ppm mainly assigned to vinylidene fluoride.

In the obtained vinylidene fluoride copolymer, the content of the structural units derived from vinylidene fluoride (VDF content: mol %) was 98.95 mol %, and the content of the structural units derived from carboxyethyl acrylate (CEA content: mol %) was 1.05 mol %.

A $^{19}$F NMR spectrum of the polymer powder was recorded in the same manner as in Production Example 1.

The $^{19}$F NMR spectrum was analyzed to determine the content of polymer chains derived from carboxyethyl acrylate in the polymer by dividing the intensity of peak(s) (an integral value) at around −94 ppm assigned to the fluorine atoms present in the vinylidene fluoride-derived structural units adjacent to the carboxyethyl acrylate units by the intensity of all the peaks assigned to the fluorine atoms in the spectrum. In the obtained vinylidene fluoride copolymer, the content of the polymer chains derived from carboxyethyl acrylate was 0.71 mol %.

The yield of the polymer was 39%, the inherent viscosity of the obtained polymer was 3.12 dL/g, the randomness was 68%, and the absorbance ratio ($A_R$) was 1.10.

Production Example 3

Production of Vinylidene Fluoride Homopolymer

In an autoclave with a capacity of 2 L, 1020 g of ion exchanged water, 0.2 g of Metolose SM-100, 2.8 g of 50 wt. % diisopropyl peroxydicarbonate-CFC 225cb solution, 400 g of vinylidene fluoride, and 2.8 g of ethyl acetate were charged, and the temperature was raised to 26° C. in 1 hour.

Thereafter, the temperature was kept at 26° C., and the polymerization was performed for total of 15.3 hours from the start of the temperature increase. Note that the pressure at the initial stage of the polymerization was 4.12 MPa-G, and the pressure at the time of stopping the polymerization was 1.62 MPa-G. Furthermore, the polymerization was performed while stirring at a rotational speed of 600 rpm.

After stopping the polymerization, the polymer slurry was heat treated at 95° C. for 60 minutes. Thereafter, the polymer slurry was dewatered, washed with water, and further dried at 80° C. for 20 hours to obtain polymer powder of vinylidene fluoride homopolymer.

The yield of the polymer was 87% and the inherent viscosity of the obtained polymer was 2.14 dL/g.

Working Example 1

In 87.50 parts by mass of N-methyl-2-pyrrolidone, 1.25 parts by mass of vinylidene fluoride-acryloyloxyethyl succinate copolymer obtained in Production Example 1, and 11.25 parts by mass of high purity alumina particles (AKP3000, manufactured by Sumitomo Chemical Co., Ltd.; primary particle size: 0.5 µm) were dissolved and dispersed to obtain a coating liquid for a separator (solid concentration: 12.5 wt. %).

The coating liquid was applied onto a separator (Celgard 2500, manufactured by Polypore International, Inc.; monolayer polypropylene porous film; film thickness: 25 µm; Gurley air permeability: 200 [s/100 mL]) using a Meyer bar (wet 24 [g/m$^2$]) and dried using a drier to obtain a separator on which a filler-containing resin film was formed. The thickness of the obtained filler-containing resin film part was approximately 2 µm.

When the coating surface of the separator on which the filler-containing resin film was formed was rubbed with a finger, nothing was attached to the finger when the finger was visually observed.

The Gurley air permeability of the separator on which the filler-containing resin film was formed was measured using a Gurley type densometer (manufactured by Toyo Seiki Seisaku-sho, Ltd.) in accordance with JIS P 8117 and ISO 5636. The Gurley air permeability of the separator was 240 s/100 mL.

Working Example 2

A separator on which the filler-containing resin film was formed was obtained in the same manner as in Working Example 1 except for using the vinylidene fluoride-carboxyethyl acrylate copolymer obtained in Production Example 2 in place of the vinylidene fluoride-acryloyloxyethyl succinate copolymer used in Working Example 1. The thickness of the obtained filler-containing resin film part was approximately 2 µm.

When the coating surface of the separator on which the filler-containing resin film was formed was rubbed with a finger, nothing was attached to the finger when the finger was visually observed.

The Gurley air permeability of the separator on which the filler-containing resin film was formed was measured using a Gurley type densometer (manufactured by Toyo Seiki Seisaku-sho, Ltd.) in accordance with JIS P 8117 and ISO 5636. The Gurley air permeability of the separator was 258 s/100 mL Comparative Example 1

A separator on which the filler-containing resin film was formed was obtained in the same manner as in Working Example 1 except for using the vinylidene fluoride homopolymer obtained in Production Example 3 in place of the vinylidene fluoride-acryloyloxyethyl succinate copolymer used in Working Example 1. The thickness of the obtained filler-containing resin film part was approximately 2 µm.

When the coating surface of the separator on which the filler-containing resin film was formed was rubbed with a finger, white powder was attached to the finger.

The Gurley air permeability of the separator on which the filler-containing resin film was formed was measured using a Gurley type densometer (manufactured by Toyo Seiki Seisaku-sho, Ltd.) in accordance with JIS P 8117 and ISO 5636. The Gurley air permeability of the separator was 236 s/100 mL.

As a result of the working examples and comparative example, all of the separators exhibited sufficient Gurley air permeability. Furthermore, in the Working Examples 1 and 2, white powder (i.e. alumina particles) was bound by vinylidene fluoride copolymer, and filler-containing resin films in which peeling of alumina particles (fillers) hardly occurs.

Working Example 3

In 82 parts by weight of N-methyl-2-pyrrolidone, 1.8 parts by weight of vinylidene fluoride-acryloyloxyethyl succinate copolymer obtained in Production Example 1, and 16.2 parts by weight of high purity alumina particles (AKP3000, manufactured by Sumitomo Chemical Co., Ltd.) were dissolved and dispersed to obtain a coating liquid for a separator (solid concentration: 18 wt. %).

Both sides of a separator (Hipore ND420, manufactured by Asahi Kasei Corporation; film thickness: 20 µm; Gurley air permeability: 320 [s/100 mL]) was successively coated with the coating liquid using a gravure coater (drier: 2 zones). The drying temperatures in the drying furnaces were 80° C. for both the first zone and the second zone. The thickness of one side of the obtained filler-containing resin film part was approximately 2 µm.

When the coating surface of the separator on which the filler-containing resin film was formed was rubbed with a finger, nothing was attached to the finger when the finger was visually observed.

The Gurley air permeability of the separator on which the filler-containing resin film was formed was measured using a Gurley type densometer (manufactured by Toyo Seiki Seisaku-sho, Ltd.) in accordance with JIS P 8117 and ISO 5636. The Gurley air permeability of the separator was 482 s/100 mL.

[Cycle Test of Non-Aqueous Electrolyte Secondary Battery Using Filler-Containing Resin Film]
(Production of Positive Electrode)
An N-methyl-2-pyrrolidone solvent slurry (solid concentration: 69 wt. %) was produced in the manner such that the weight ratio of lithium cobaltate (Cellseed C5, manufactured by Nippon Chemical Industrial Co., Ltd.) to a conductivity promoter (Super P, manufactured by TIMCAL) to PVDF (KF#1100, manufactured by Kureha Corporation) was 93:3:4. The slurry was coated on Al foil (thickness: 15 µm) using a 115 µm spacer. Thereafter, the coated foil was dried at 120° C. for 3 hours, and pressed to obtain a positive electrode in which the bulk density of the layer obtained by coating and drying the slurry was 3.6 g/cm$^3$, and the basis weight was 150 g/m$^2$.

(Production of Negative Electrode)
An aqueous solvent slurry (solid concentration: 53 wt. %) was produced in the manner such that the weight ratio of BTR918 (modified natural graphite, manufactured by BTR) to a conductivity promoter (Super P, manufactured by TIMCAL) to SBR (styrene-butadiene rubber latex; BM-400, manufactured by Zeon Corporation) to CMC (carboxymethyl cellulose; Cellogen 4H, manufactured by Dai-ichi Kogyo Seiyaku Co., Ltd.) was 90:2:3:1. The slurry was coated on Cu foil (thickness: 10 µm) using a 90 µm spacer. Thereafter, the coated foil was dried at 120° C. for 3 hours, and pressed to obtain a negative electrode in which the bulk density of the layer obtained by coating and drying the slurry was 1.5 g/cm$^3$, and the basis weight was 56 g/m$^2$.

(Production of Battery and Cycle Test)
A laminated cell was obtained by connecting the positive electrode and the negative electrode via the separator on which the filler-containing resin film was formed obtained in Working Example 3, impregnating the electrolyte solution (ethylene carbonate (EC)/ethyl methyl carbonate (EMC)=3/7, LiPF$_6$ 1.2 M), and sealing the assembly in an aluminum pouch using a vacuum sealer to obtain a laminated cell.

Three cycles of charge-discharge cycles including constant current constant voltage charging (charging conditions: 0.1 C and 4.2 V) and cut-off constant current discharging (discharging conditions: 0.1 C and 3V) were performed, and then 30 cycles of charge-discharge cycles including constant current constant voltage charging (charging conditions: 1 C and 4.2 V) and cut-off constant current discharging (discharging conditions: 1 C and 3 V) were performed.

Figure 2:
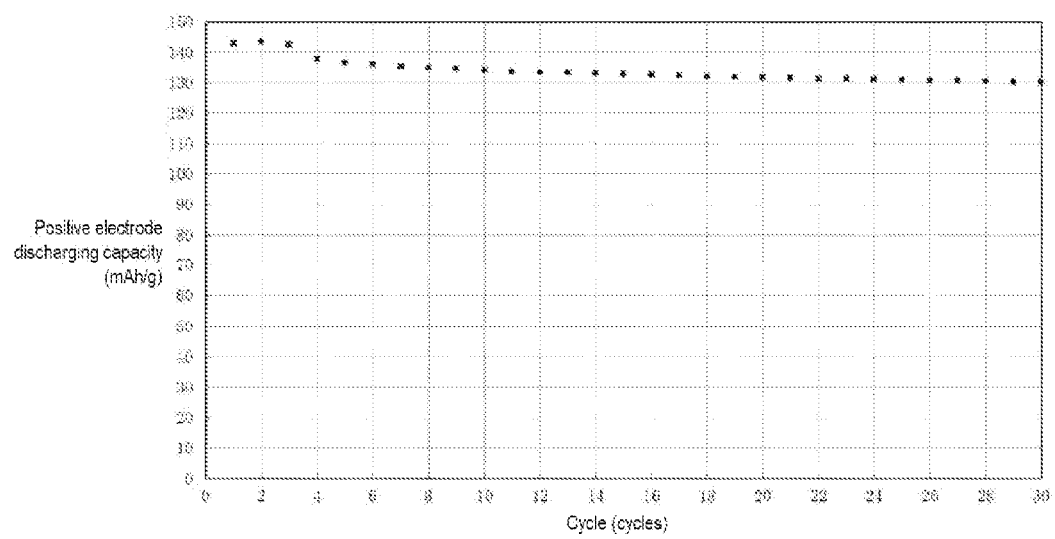
FIG. 2 shows the result of a cycle test of a laminated cell obtained in Working Example 3 of the present invention.

The results are shown in FIG. 2.

Comparative Example 2

A separator on which the filler-containing resin film was formed was obtained in the same manner as in Working Example 3 except for using the vinylidene fluoride homopolymer obtained in Production Example 3 in place of the vinylidene fluoride-acryloyloxyethyl succinate copolymer.

When the coating surface of the separator on which the filler-containing resin film was formed was rubbed with a finger, white powder was attached to the finger.

[Measurement of Peel Strength of Filler-Containing Resin Film]
Measurements of the peel strength of the filler-containing resin film were performed for the separator on which the filler-containing resin film obtained in Working Example 3 was formed, and for the separator on which the filler-containing resin film obtained in Comparative Example 2 was formed. The measurement was performed by attaching an adhesive tape to the surface of the filler-containing resin film, and pulling the adhesive tape at an angle of 180° using a TENSILON Universal Testing Instrument (manufactured by A&D Company, Limited).

The results are shown in Table 1.

TABLE 1

| Working Example 3 | 23.3 gf/mm |
|---|---|
| Comparative Example 2 | 0.4 gf/mm |

As a result of the working examples and comparative examples, the filler-containing resin film of the invention of the present application can be used as a separator auxiliary layer constituting a non-aqueous electrolyte secondary battery since the peeling off of alumina particles (fillers) hardly occurs, adhesion to separators is excellent, and movement of ions are not inhibited.

REFERENCE SIGNS LIST

10 . . . Laminated structure of battery
11 . . . Positive electrode

111 . . . Positive electrode mixture layer
112 . . . Positive electrode current collector
12 . . . Negative electrode
121 . . . Negative electrode mixture layer
122 . . . Negative electrode current collector
13 . . . Separator
14a, 14b . . . Separator auxiliary layer

The invention claimed is:

1. A filler-containing resin film for a non-aqueous electrolyte secondary battery comprising:
a vinylidene fluoride copolymer obtained by copolymerizing vinylidene fluoride and a compound represented by formula (2); and
an insulating inorganic filler:

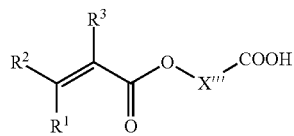

(2)

wherein $R^1$, $R^2$, and $R^3$ are each independently hydrogen atoms, chlorine atoms, or alkyl groups having from 1 to 5 carbons; and
$X'''$ is an atomic group having a molecular weight of 456 or less and having a main chain having from 1 to 18 atoms,
wherein the average particle size of the insulating inorganic filler is from 5 nm to 2 μm,
wherein the filler-containing resin film comprises from 90 to 99.5 parts by mass of the insulating inorganic filler, per 100 parts by mass of the resin film, and
wherein in the filler-containing resin film, the insulating inorganic filler adheres to the vinylidene fluoride copolymer such that shedding of the inorganic filler from the resin film is suppressed.

2. The filler-containing resin film for a non-aqueous electrolyte secondary battery according to claim 1, wherein the insulating inorganic filler is alumina or silicon dioxide.

3. A method for producing a filler-containing resin film for a non-aqueous electrolyte secondary battery, the method comprising:
applying a resin composition on a substrate, the resin composition comprising:
a vinylidene fluoride copolymer obtained by copolymerizing vinylidene fluoride and a compound represented by formula (2),
an insulating inorganic filler, and
an organic solvent; and
drying the resin composition:

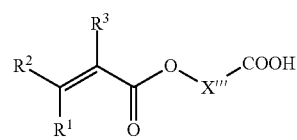

(2)

wherein $R^1$, $R^2$, and $R^3$ are each independently hydrogen atoms, chlorine atoms, or alkyl groups having from 1 to 5 carbons; and
$X'''$ is an atomic group having a molecular weight of 456 or less and having a main chain having from 1 to 18 atoms,
wherein the average particle size of the insulating inorganic filler is from 5 nm to 2 μm,
wherein the filler-containing resin film comprises from 90 to 99.5 parts by mass of the insulating inorganic filler, per 100 parts by mass of the resin film, and
wherein in the filler-containing resin film, the insulating inorganic filler adheres to the vinylidene fluoride copolymer such that shedding of the inorganic filler from the resin film is suppressed.

4. The method for producing a filler-containing resin film for a non-aqueous electrolyte secondary battery according to claim 3, wherein the substrate is an electrode or a separator.

* * * * *